United States Patent
Kutka et al.

(10) Patent No.: US 7,173,968 B1
(45) Date of Patent: Feb. 6, 2007

(54) METHOD FOR CODING AND DECODING A DIGITALIZED IMAGE

(75) Inventors: Robert Kutka, Geltendorf (DE); Stathis Panis, Limassol (CY)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/423,454

(22) PCT Filed: May 7, 1998

(86) PCT No.: PCT/DE98/01276

§ 371 (c)(1),
(2), (4) Date: Nov. 8, 1999

(87) PCT Pub. No.: WO98/51084

PCT Pub. Date: Nov. 12, 1998

(30) Foreign Application Priority Data

May 7, 1997 (DE) .................................. 197 19 470

(51) Int. Cl.
*H04N 7/12* (2006.01)
(52) U.S. Cl. ............ 375/240; 375/240.01; 375/240.02; 375/240.12
(58) Field of Classification Search ................ 375/240, 375/240.15, 240.16, 240.17, 240.23, 240.01, 375/240.12, 240.02; 302/150; 382/199, 382/226, 250, 261, 262, 298; 358/1.2, 465
See application file for complete search history.

(56) References Cited

U.S. PATENT DOCUMENTS

| | | | |
|---|---|---|---|
| 4,736,439 A * | 4/1988 | May ............................ 382/262 |
| 5,003,618 A * | 3/1991 | Meno .......................... 382/261 |
| 5,367,385 A * | 11/1994 | Yuan .......................... 358/465 |
| 5,418,714 A | 5/1995 | Sarver |
| 5,422,964 A * | 6/1995 | Devimeux et al. .......... 382/226 |
| 5,440,653 A * | 8/1995 | Greggain et al. ........... 382/298 |
| 5,568,196 A | 10/1996 | Hamada et al. .......... 348/416.1 |
| 5,748,792 A * | 5/1998 | Wober ........................ 382/250 |
| 5,832,115 A * | 11/1998 | Rosenberg .................. 382/199 |
| 5,854,858 A * | 12/1998 | Girod et al. ................ 382/150 |
| 5,867,221 A * | 2/1999 | Pullen et al. .......... 375/240.16 |
| 5,896,176 A * | 4/1999 | Das et al. .............. 375/240.15 |
| 5,910,827 A * | 6/1999 | Kwan et al. ........... 375/240.27 |
| 6,075,926 A * | 6/2000 | Atkins et al. ................ 358/1.2 |
| 6,275,532 B1 * | 8/2001 | Hibi et al. ............. 375/240.17 |

FOREIGN PATENT DOCUMENTS

DE     196 04 050 A1     2/1997

(Continued)

OTHER PUBLICATIONS

W. Zeng, et al., "Directional Spatial Interpolation for DCT-Based Low Bit Rate Coding", Proc. of the Intl. Conf. on Acoustics, Speech, and Signal Proc. (ICASSP), vol. 4, May 7-10, 1996, pp. 2100-2103.

(Continued)

*Primary Examiner*—Allen Wong
(74) *Attorney, Agent, or Firm*—Schiff Hardin LLP

(57) ABSTRACT

A method and an arrangement in which a digitized image with picture elements is allocated to a number of image segments. The image segments, preferably image blocks, are spread such that interspaces remain between the image blocks to be encoded. The interspaces are interpolated after decoding.

24 Claims, 2 Drawing Sheets

FOREIGN PATENT DOCUMENTS

WO     WO 96/32717     * 10/1996
WO     WO 98/15125       4/1998

OTHER PUBLICATIONS

Z. He, et al., "An Adaptive Image Codign Technique Using Interpolative Mixed VQ", Proc. of the Intl. Symp. on Circuits and Systems, San Diego, May 10-13, 1992, vol. 5, May 10, 1992, pp. 2300-2303.

H. Sun, et al., "Subsampled Vector Quantization with Nonlinear Estimation Using Neural Network Approach", SPIE, Visual Comm. and Image Proc. '91: Visual Comm., vol. 1605, pp. 214-220.

R. Kutka, et al., "Improving the Image Quality of Block-based Video Coders by Exploiting Interblock Redundancy", Proc. of the First Intl. Workshop on Wireless Image/Video Comm., Loughborough, UK., Sep. 4-5, 1996, IEEE, pp. 48-56.

S. Panis, et al., "Reduction of Block Artifacts by Selective Removal and Reconstruction of the Block Borders", PCS 97, Picture Coding Symp., Berlin, Germany, Sep. 10-12, 1997, No. 143, pp. 705-708.

F. Hofmeir, "Multimedia für unterwegs", Funkschau, No. 7, 1996, pp. 75-77.

D. LeGall, "MPEG: A Video Compression Standard for Multimedia Applications", Comm. of the ACM, vol. 34, No. 4, Apr. 1991, pp. 47-58.

M. Liou, "Overview of the px64 kbit/s Video Coding Standard", Communications of the ACM, vol. 34, No. 4, Apr. 1991, pp. 60-63.

G. Wallace, "The JPEG Still Picture Compression Standard", Communications of the ACM, vol. 34, No. 4, Apr. 1991, pp. 31-44.

B. Girod, et al., "Spatial Shaping: A Fully Comopatible Improvement of DCT Codign", Picture Coding Symp., Lausanne, Switzerland, 1993.

R. Kutka, et al., "Quality Improvement of low data-rate compressed video signals by pre- and post-processing", SPIE, Digital Compression Technologies and Systems for Video Comm., vol. 2952, Oct. 7-9, 1996, pp. 42-49.

S. Minami, et al., "An Optimization Approach for Removing Blocking Effects in Trnasform Coding", IEEE Transactions on Circuits and Systems for Video Technology, vol. 5, No. 2, Apr. 1995, pp. 74-82.

ITU-T Recommendation H.245, Control protocol for multimedia communication, Feb. 1998.

* cited by examiner

METHOD FOR CODING AND DECODING A DIGITALIZED IMAGE

BACKGROUND OF THE INVENTION

The present invention is directed to a method and an arrangement for encoding and decoding a digitized image with picture elements.

In image compression methods for encoding or decoding digitized images, the images are usually divided into image segments.

A distinction is made between two approaches for image encoding, object-based image encoding and block-based image encoding. Object-based methods for image encoding are described in S. Hofmeir, "Multimedia fur unterwegs", Funkschau, No. 7, 1996, pp. 75–77. An overview of block-based image encoding methods can be found in D. Le Gall, "MPEG: A Video Compression Standard for Multimedia Applications", Communications of the ACM, Vol. 34, No. 4, April 1991, pp. 47–58 (MPEG); M. Liou "Overview of the px64 kbits/s Video Coding Standard", Communications of the ACM, Vol. 34, No. 4, April 1991, pp. 60–63 (H.263); and G. Wallace, "The JPEG Still Picture Compression Standard", Communications of the ACM, Vol. 34, No. 4, April 1991, pp. 31–44 (JPEG).

Given block-based image encoding methods, the image is divided into what are referred to as image blocks that usually comprise a rectangular shape and respectively comprise 8×8 or 16×16 picture elements. In the known methods, the blocks are transformed with the assistance of a transformation encoding, preferably discrete cosign transformation (DCT), wavelet transformation or a transformation with vector quantization.

Losses in the image quality must be accepted in the transmission of moving images over narrow-band channels such as, for example, 40 kbit/sec or lower for picture telephony applications. The most noticeable disturbances are the brightness discontinuities known as block artifacts in block-based image encoding or as object edge artifacts in object-based image encoding, i.e. the abrupt changes of the values of the encoding information that is allocated to the individual picture elements produced by discontinuity points at the image block edges or at the image object edges.

What is to be understood below by encoding information is, for example, luminance information or chromance information that is respectively unambiguously allocated to the picture elements.

Two different approaches are known in order to reduce the block artifacts.

The first approach is based on corrections in the frequency domain of the spectral transformation. A method referred to as spatial shaping reduces the edge artifacts at the expense of the image quality in the interior of the block. This method is known from W. Gerod et al., "Spatial Shaping: A Fully Compatible Improvement of DCT-Coding", Picture Coding Symposium, Lausanne, France, 1993. Another method that is based on corrections in the frequency domain employs the prediction of the DCT coefficients. Although the quality in the interior of the block is improved by this procedure described in R. Kutka, A. Kaup and M. Hager, "Quality Improvement of Low Data-Rate Compressed Signals by Pre- and Postprocessing", Digital Compression Technologies and Systems for Video Communications, SPIE, Vol. 2952, 07–09 Oct. 1996, pp. 42–49, the block artifacts are only partially reduced.

The second approach for reducing block artifacts is based on corrections in the location domain. S. Minami and A. Zakhor, "An Optimization Approach for Removing Blocking Effects in Transform Coding", IEEE Transactions on Circuit Systems Video Technology, Vol. 5, No. 2, April 1995, pp. 74–82 discloses that the picture elements at the block edges be subjected to a low-pass filtering, as a result whereof the discontinuity points are smoothed and appear less disturbing. H.245 Standard, ITU Standard Recommendation discloses that different filters be employed for different image blocks, dependent, for example, on the quantization of the image block or dependent on the motion vector.

German Patent Application No. 196 040 50 discloses a method for controlling various transmission parameters in the framework of the H.263 standard, which is referred to as J.245 standard. It is known within the framework of the H.245 standard to inform a second arrangement with which communication is desired of specific transmission properties from a first arrangement via what is referred to as a capability table wherein the respective feature that is to be employed within the framework of the communication connection is indicated.

SUMMARY OF THE INVENTION

It is an object of the present invention to provide an arrangement and methods for encoding and for decoding a digitized image with which the required transmission capacity is reduced compared to known methods without the image quality being noticeably deteriorated.

This object is inventively achieved in accordance with the present invention in a method for encoding a digitized image having picture elements, the method comprising the steps of: grouping all except at least one picture elements of a digitized image into a number of image segments, the at least one ungrouped picture element being from at least one area of the image located between image segments; and encoding only the picture elements being grouped into an image segment.

In an embodiment, the digitized image, which comprises picture elements, is divided into a number of image segments. The division, i.e. the grouping, ensues such that at least one picture element is not allocated to an image segment for at least a part of the image between image segments. Only the picture elements that were allocated to an image segment are in fact encoded.

In an embodiment, an encoded image having picture elements that are allocated to image segments are decoded in that the image segments are decoded and new picture elements corresponding to non-encoded picture elements of the encoded image are inserted between the decoded image segments. An interpolation is implemented between the image segments, as a result whereof encoding information is allocated to the new picture elements.

In an embodiment, in a method for encoding and decoding of a digitized image, the picture elements are again grouped into a number of image segments. The grouping ensues such that at least one picture element is not allocated to an image segment for at least a part of the image between image segments. Only the picture elements that were allocated to an image segment are encoded. The encoded image segments are transmitted and the image segments are decoded. New picture elements corresponding to the non-encoded picture elements of the encoded image are inserted between the decoded image segments. A filtering is undertaken between the image segments, as a result whereof encoding information is allocated to the new picture elements.

The invention can clearly be seen therein that the transmission of image lines and image columns between image segments, for example between image blocks is foregone in the present method. The block grid upon employment of a block-based image encoding method is spread such that interspaces remain between the image blocks to be encoded, and the interspaces are interpolated after the decoding.

As a result of this procedure, the required transmission capacity is reduced without the image quality in the interior of the image segment being noticeably deteriorated. Further, the block artifacts or the edge artifacts of the image objects are considerably reduced.

In an embodiment, it is advantageous to apply a low-pass filtering to the image segments, as a result whereof a good smoothing of the image segment edges is achieved. It is thereby advantageous for saving required calculating time to implement the filtering essentially at the image segment edges.

In an embodiment, it is also advantageous to implement a further filtering of the image to be encoded before the spreading and the encoding. The further filtering corresponds to a sub-sampling filtering as employed when sub-sampling images for improving the image quality.

In an embodiment, it is also advantageous to implement an interpolation filtering after the decoding, this taking effect essentially at the image segment edges. This corresponds to an over-sampling filter, as utilized when enlarging images.

In an embodiment, the method can be very simply implemented given block-based image encoding methods wherein the image segments are image blocks. At least respectively one picture element is not allocated to an image block between the image blocks. A very simple division of the picture elements into the image blocks is thus achieved and, connected therewith, a very simple selection of picture elements not to be encoded is achieved.

In an embodiment, in order to further enhance the quality of the decoded image, it is advantageous to employ different filters for different image segments.

In an embodiment, it is thereby advantageous to select the filters dependent on the image quality of an image block, whereby the strength of the filter employed increases with the reduction of the image quality of the image block.

In an embodiment, it is also advantageous to select the different filters dependent on the motion vector of an image block, whereby the strength of the filter employed increases with the size of the motion vector that is allocated to the respective image block.

The method is very well-suited for utilization for image encoding according to the H.263 standard.

In an embodiment, an advantageous possibility for integration of the present method into the H.263 standard is the employment of the capability table according to the H.245 standard, wherein the option for implementation of this method is entered as a separate performance feature and becomes possible within the framework of the communication control that is implemented according to the H.245 standard.

These and other features of the invention(s) will become clearer with reference to the following detailed description of the presently preferred embodiments and accompanied drawings.

DETAILED DESCRIPTION OF THE PRESENTLY PREFERRED EMBODIMENTS

Figure 2:
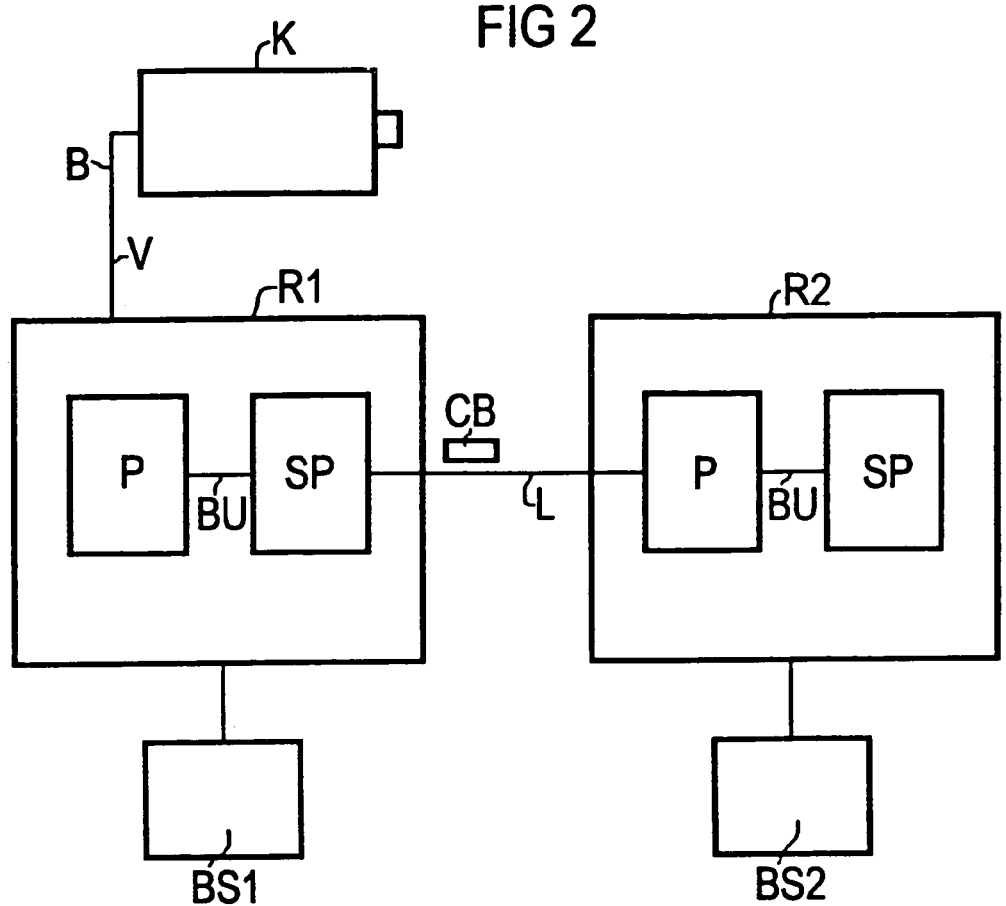
FIG. 2 is a block diagram of an arrangement comprising a camera, two computers and two picture screens constructed and operated in accordance with the present invention.

FIG. 2 shows a camera K that is connected to a first computer R1 via a connection V. The camera K supplies a sequence of digitized images B to the first computer R1. The first computer R1, just like a second computer R2, comprises a processor P as well as a memory S for storing the image data that are connected to one another via a bus BU. The first computer R1 and the second computer R2 are connected to one another via a line L. The first computer R1 and the second computer R2 are respectively connected to a first picture screen BS1 or to a second picture screen BS2 for the presentation of the images B registered by camera K and potentially encoded and decoded.

The camera K registers a scene and supplies it as a sequence of images B to the first computer R1, and this is encoded in the first computer R1 according to the method for encoding that is set forth below. The encoded images CB are transmitted via the line L to the second computer R2 and are decoded in the second computer R2 according to the method for decoding the encoded digital images CB that is set forth below.

Figure 1:
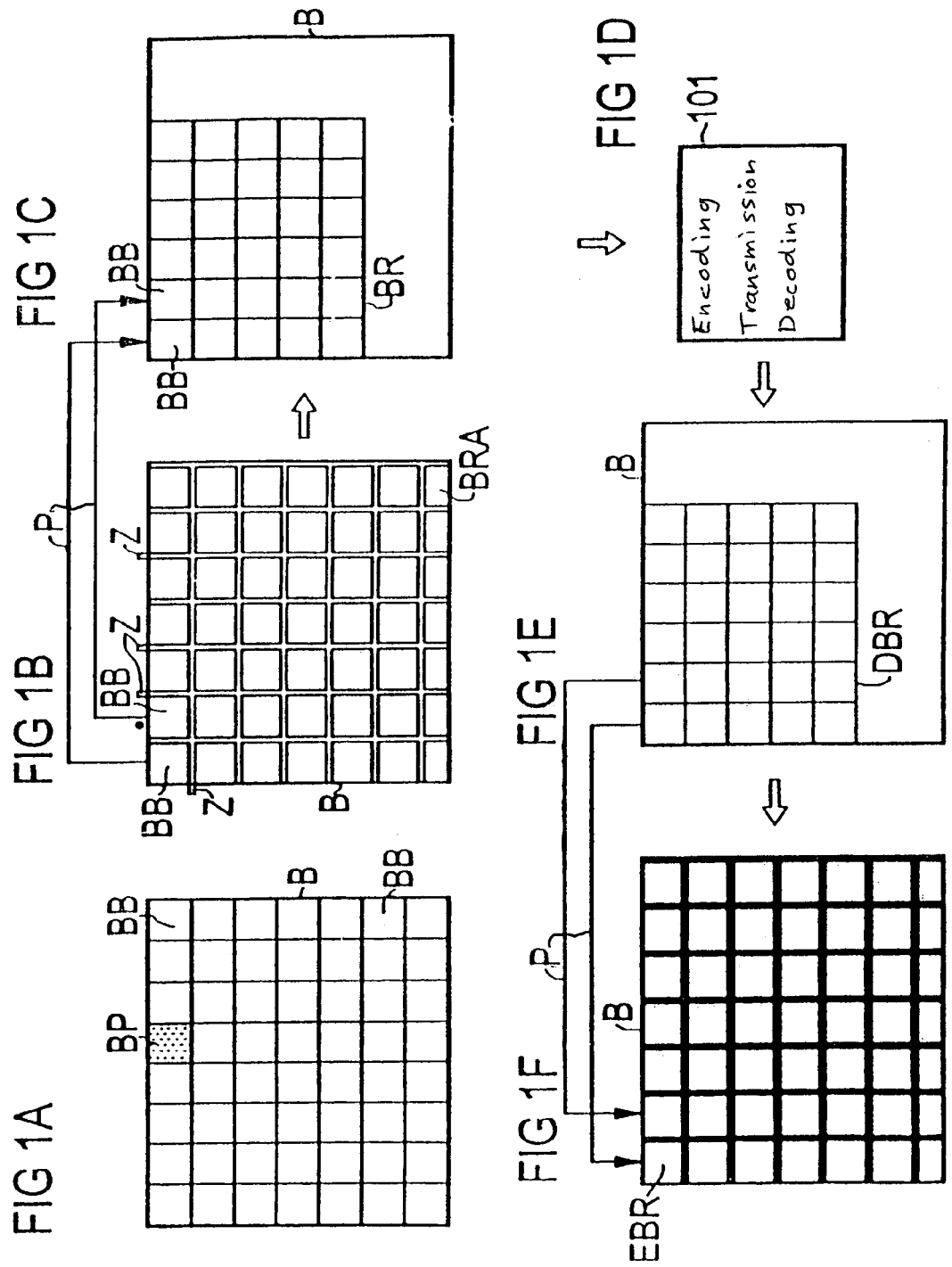
FIGS. 1A through 1F show the method for encoding and decoding a symbolically presented digitized image having image blocks in accordance with the present invention.

An image B is symbolically shown in FIG. 1A. The image B in FIG. 1a is subdivided into image blocks BB having respectively 8×8 picture elements BP. This is the standard procedure in block-based image encoding.

FIG. 1B shows the image B with picture elements BP that are in turn grouped into image blocks BB each having respectively 8×8 picture elements BP. However, a respective interspace Z of at least one picture element BP is provided between the individual image blocks BB. The picture elements BP that are located in the interspace Z are not encoded, as explained below.

This obviously means that the picture elements BP of the interspaces Z are simply "omitted" in the encoding. By deleting the picture elements BP of the interspace Z, a reduced image grid BR of the image B arises that only comprises picture elements BP that were allocated to the image blocks BB (see FIG. 1C).

Arrows P of FIG. 1B to FIG. 1C symbolically show the imaging of the individual image blocks BB of the block grid with interspaces Z to the reduced image grid BR.

The encoding is implemented for the reduced image grid BR, i.e. only for the picture elements BP of the image blocks BB. This encoding ensues as transformation encoding according to discrete cosign transformation (DCT).

The method according to the H.263 standard is utilized as an encoding method. The encoded image data CB are transmitted to the second computer R2, received thereat and decoded (see FIG. 1D).

After the decoding, potentially upon employment of inverse discrete cosign transformation according to the H.263 method, a decoded, reduced image grid DBR derives that corresponds to the reduced image grid BR (see FIG. 1E).

The decoded, reduced image grid DBR is now expanded onto an expanded image grid EBR having the original size of the image B, in that the interspaces Z with the non-encoded picture elements are in turn filled between the image blocks BB (see FIG. 1F).

Image blocks BB that, due to the interspaces Z, lie at the image edge BRA and do not comprise 8×8 picture elements are processed by padding, i.e. filling up the image blocks BB with encoding information by extrapolation of the picture elements BP in fact present in the image block BB. The filling can ensue by allocation of the encoding information of the picture elements BP that were previously not contained in the image block of the image edge BRA with a constant value.

The relationships of the decoded image blocks BB in the decoded, reduced block grid BR from FIG. 1E and the image blocks BB in 1F after insertion of the interspaces Z are shown by arrows P in FIGS. 1E and 1F.

New picture elements are inserted into the decoded, reduced block grid DBR between the decoded image segments, i.e. the image blocks BB, being inserted in conformity with the non-encoded, i.e. "omitted" picture elements BP of the encoded image.

In a last step, an interpolation filtering between the individual image blocks BB across the block edges and across the interspaces Z, i.e. over the picture elements of the interspaces Z, is implemented in the expanded image grid EBR. An interpolation of the "missing" picture elements is thus achieved.

A low-pass filtering at the block edges is implemented as filtering. A number of filters for different image blocks is selected according to the semantics of the individual image blocks BB. The selection of the filters ensues dependent on the motion vector of an image block, whereby the strength of the low-pass filter employed increases with the size of the motion vector and/or dependent on the image quality of an image block, whereby the strength of the low-pass filter employed increases with the reduction in image quality of the image block BB.

It is not necessary to divide the image B into image blocks BB. It is likewise possible to utilize an object-based image encoding method within the scope of the inventive method, whereby the picture elements BP are then grouped into a number of image segments having an arbitrary shape.

Further, any desired object-based or block-based image encoding method, for example MPEG, JPEG, H.263 can be utilized, as can any desired transformation encoding, for example discrete sine transformation, a wavelet transformation or a transformation on the basis of vector quantization.

Figure 3:
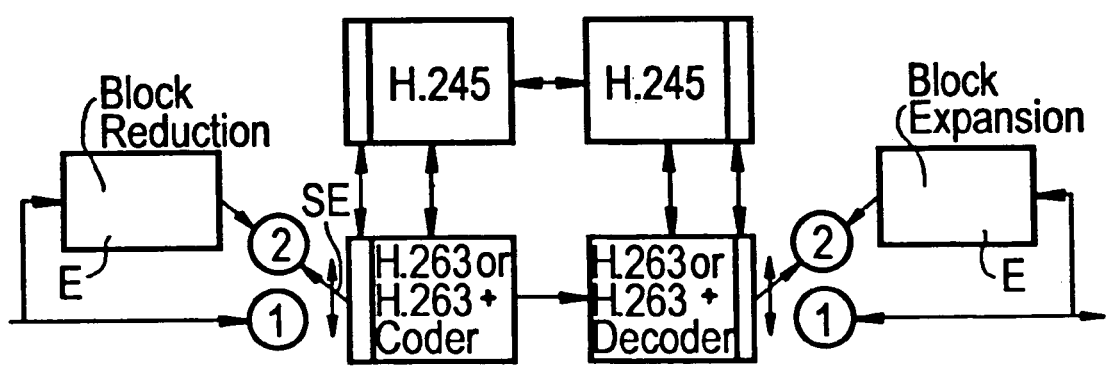
FIG. 3 is a block circuit diagram showing the integration of the present method into the method according to the H.263 standard.

FIG. 3 also symbolically shows an embodiment of how the method can be integrated into the existing H.263 standard. To this end, the mechanism of what is referred to as the capability table CT according to the H.245 standard is utilized (see FIG. 3). A selection as to whether the standard H.263 method or the method for image encoding expanded by the inventive method should be employed can be made via a switch element SE.

The expansion is symbolically shown by a block E in FIG. 3. When the expansion is selected, then a corresponding parameter is stored in the capability table CT in the first computer arrangement R1, and is proposed in the framework of the setup of the communication connection to the second computer unit R2, which likewise comprises modules for the implementation of the H.245 standard and of the H.263 standard and of the expansion module E.

After agreement about the image encoding method to be employed has been reached between the computer arrangements R1, R2, either the method according to H.263 or the method expanded by the inventive method is employed.

The invention can clearly be seen therein that the transmission of image lines and image columns between image segments, for example between image blocks, is foregone in the method. The block grid given employment of a block-based image encoding method is spread such that interspaces remain between the image blocks to be encoded and the interspaces are interpolated after the decoding.

Although modifications and changes may be suggested by those of ordinary skill in the art, it is the intention of the inventors to embody within the patent warranted hereon all changes and modifications as reasonably and properly come within the scope of their contribution to the art.

We claim:

1. A method for encoding and decoding a digitized image having picture elements, said method comprising the steps of:
   grouping all except at least one picture elements of said digitized image into a number of image segments based on a mathematically defined region of said digitized image derived solely from said digitized image itself, said at least one ungrouped picture element being from at least one area of said image located between image segments;
   encoding said image in said first arrangement by only encoding said picture elements being grouped into an image segment;
   transmitting said encoded image segments from said first arrangement to a second arrangement;
   decoding said transmitted image segments in said second arrangement;
   inserting new picture elements corresponding to said non-encoded picture elements of said encoded image in said second arrangement in an area between said decoded image segments;
   interpolating said area between said image segments in said second arrangement; and
   allocating encoding information resulting from said interpolating to said new picture elements.

2. The method according to claim 1, further comprising the step of:
   prior to encoding said grouped picture elements, filtering said image to be encoded.

3. The method according to claim 1, wherein said interpolation is performed by low-pass filtering.

4. The method according to claim 3, wherein said low-pass filtering is performed essentially at edges of said image segments.

5. The method according to claim 3, wherein said filtering is performed after said decoding.

6. The method according to claim 5, wherein said filtering is performed essentially at edges of said image segments.

7. The method according to claim 1, further comprising the step of:
   prior to encoding said grouped picture elements, filtering said image to be encoded; and
   wherein said interpolation is performed by low-pass filtering.

8. The method according to claim 1, wherein said image segments are image blocks.

9. The method according to claim 8, wherein at least respectively one picture element is not grouped into any image block between said image blocks.

10. The method according to claim 1, wherein said interpolating is performed by a number of filters.

11. The method according to claim 10, wherein said filters have characteristics dependent on an image quality of an image block; and wherein a strength characteristic of a filter increases with a reduction of said image quality of said image block.

12. The method according to claim 10, wherein said filters have characteristics dependent on a motion vector of an image block; and wherein a strength characteristic of a filter increases with a size of a motion vector being allocated to a respective image block.

13. The method according to claim 1, wherein said encoding is according to the H.263 standard.

14. The method according to claim 1, wherein said encoding is according to the H.263 standard; and wherein said encoded image is transmitted from said first arrangement to said second arrangement by employing a capability table according to the H.245 standard.

15. The method according to claim 1, further comprising the step of:
 implementing a motion compensation upon said digitized image.

16. An arrangement for encoding and decoding a digitized image having picture elements, said arrangement comprising:
 a first arrangement having a first processor unit comprising a processor and a memory including a program comprising the steps of:
  grouping all except at least one picture elements of said digitized image into a number of image segments based on a mathematically defined region of said digitized image derived solely from said digitized image itself, said at least one ungrouped picture element being from at least one area of said image located between image segments; and
  encoding said image by only encoding said picture elements being grouped into an image segment;
 a transmitter for transmitting said encoded image from said first arrangement to a second arrangement;
 a second arrangement having a second processor unit comprising a processor and a memory including a program comprising the steps of:
  decoding said transmitted image segments;
  inserting new picture elements corresponding to said non-encoded picture elements of said encoded image in said second arrangement in an area between said decoded image segments;
  interpolating said area between said image segments in said second arrangement; and
  allocating encoding information resulting from said interpolating to said new picture elements.

17. The arrangement according to claim 16, wherein said second processor unit is programmed to interpolate by low-pass filtering.

18. The arrangement according to claim 17, wherein said first processor unit is programmed to encode according to the H.263 standard; and wherein said encoded image is transmitted from said first arrangement to said second arrangement by employing a capability table according to the H.245 standard.

19. The arrangement according to claim 16, wherein said first processor unit is programmed to realize said image segments as image blocks, and wherein at least respectively one picture element is not grouped into any image block between said image blocks.

20. The arrangement according to claim 16, wherein said second processor unit is programmed to perform said interpolating by a number of filters.

21. The arrangement according to claim 20, wherein said wherein said filters have characteristics dependent on an image quality of an image block; and wherein a strength characteristic of a filter increases with a reduction of said image quality of said image block.

22. The arrangement according to claim 20, wherein said filters have characteristics dependent on a motion vector of an image block; and wherein a strength characteristic of a filter increases with a size of a motion vector being allocated to a respective image block.

23. The arrangement according to claim 16, wherein said first processor unit is programmed to encode according to the H.263 standard.

24. The arrangement according to claim 16, wherein said first processor unit is programmed to implement a motion compensation upon said digitalized image.

* * * * *